(12) United States Patent  
Ohtake

(10) Patent No.: US 6,266,254 B1  
(45) Date of Patent: Jul. 24, 2001

(54) SWITCHING POWER CIRCUIT

(75) Inventor: Tetsushi Ohtake, Tsurugashima (JP)

(73) Assignee: Toko, Inc., Tsurugashima (JP)

( * ) Notice: Subject to any disclaimer, the term of this patent is extended or adjusted under 35 U.S.C. 154(b) by 0 days.

(21) Appl. No.: 09/655,112

(22) Filed: Sep. 5, 2000

(30) Foreign Application Priority Data

Sep. 7, 1999 (JP) .................................................. 11-252939

(51) Int. Cl.[7] .......................... H02M 3/335; H02M 7/538
(52) U.S. Cl. .............................................. 363/22; 363/133
(58) Field of Search .............................. 363/22, 23, 131, 363/133

(56) References Cited

U.S. PATENT DOCUMENTS

| | | | |
|---|---|---|---|
| 4,755,923 | * | 7/1988 | Maeba et al. ............................ 363/56 |
| 5,930,124 | * | 7/1999 | Otake ...................................... 363/21 |
| 6,009,001 | * | 12/1999 | Otake ...................................... 363/23 |

FOREIGN PATENT DOCUMENTS

08126348-A * 5/1996 (JP) .

* cited by examiner

Primary Examiner—Peter S. Wong  
Assistant Examiner—Bao Q. Vu  
(74) Attorney, Agent, or Firm—Frishauf, Holtz, Goodman, Langer & Chick, P.C.

(57) ABSTRACT

In prior art, the operation of the switching transistors Q1 and Q2 is within a range of class-AB to class-B and they are not good at efficiency since it is difficult to change the operating point thereof. There is disclosed an innovative switching power circuit which is self-oscillated by a tertiary winding N3 so that each of the pair of switching elements Q1 and Q2 may be conducted alternately and thereby a current flowing from the centertap is switched so as to selectively flow alternately to one side of the primary winding N1 or to other side thereof to generate an AC voltage on a secondary winding N2, said switching power circuit characterized by that an operating point of the switching elements Q1, Q2 is changed from that in starting by using a DC voltage generated by a switching operation of the switching elements Q1, Q2 as an inverse bias power source for the switching elements Q1, Q2.

2 Claims, 1 Drawing Sheet

SWITCHING POWER CIRCUIT

FIELD OF THE INVENTION

The present invention relates to a switching power circuit used for back-light of a liquid crystal display device or the like.

DESCRIPTION OF THE PRIOR ART

Conventionally, there has been used a switching power circuit shown in FIG. 2. A capacitor C1 is a capacitor for smoothing a power supply voltage connected to an input terminal 1. Two transistors Q1 and Q2 are push-pull connected switching transistors whose emitters are connected with each other and are grounded. Transformer T is composed of a primary winding N1, a secondary winding N2 and a tertiary winding N3, wherein each end of the primary winding N1 is connected to each collector of the transistors Q1 and Q2 respectively.

A bias resistor R is disposed between the input terminal 1 and a base of the transistor Q1 to connect them with each other, and each base of the transistors Q1 and Q2 is connected to each end of the tertiary winding N3 for feedback oscillation. A capacitor C3 is a resonant capacitor connected parallel with the primary winding N1. A centertap of the primary winding N1 is connected to the input terminal 1 through a choke coil L.

Each end of the secondary winding N2 is connected to an output terminal 2 through diodes D1 or D2 respectively, and a centertap of the secondary winding N2 is grounded. An end of a smoothing capacitor C2 is connected to a middle point between the output terminal 2 and the diodes D1 and D2 and other end of the capacitor C2 is grounded.

In the power circuit configured as described above, when the DC voltage Vin is applied to the input terminal 1, a self-oscillation is generated by the tertiary winding N3. Thereby, the transistors Q1 and Q2 are switched by turns to generate AC voltage on the secondary winding N2. This AC voltage is full-wave rectified by the diodes D1 and D2 and is smoothed by the capacitor C2. As a result, DC voltage V0 is provided for the output terminal 2.

In the power circuit configured as described above, an operating point of the switching transistors Q1 and Q2 is determined by the resistor R. Thereby, there occurs a problem that, since an operating condition of the whole power circuit depends on a value of the resistor R, it is difficult to change the operating point over wide range.

Thus, the operation of the transistors Q1 and Q2 is generally within a range of class-AB to class-B operations. Accordingly, the object of the present invention is to provide a circuit capable of making the operation of the transistors Q1 and Q2 improved into class-B to class-C operations. Another object of the present invention is to provide a switching circuit which allows a thermal stability to be easily secured and also allows an operating efficiency to be improved.

SUMMARY OF THE INVENTION

The present invention provides a switching power circuit comprising: a pair of switching elements connected to an end of a DC power source; a transformer including a primary winding having a centertap, a secondary winding connected to a load and a tertiary winding for a feedback oscillation; and a resonant capacitor connected parallel with the primary winding;

wherein each end of the primary winding is connected to each of the pair of switching elements respectively; the centertap is connected to other end of the DC power source through a choke coil; each end of the tertiary winding is connected to each of the pair of switching elements respectively;

so that the switching power circuit is self-oscillated by a tertiary winding such that each of the pair of switching elements may be conducted alternately and thereby a current flowing from the centertap is switched so as to selectively flow alternately to one side of the primary winding or to other side of the primary winding to generate AC voltage on a secondary winding;

said switching power circuit characterized by that an operating point of the switching elements is changed from that in starting by using a DC voltage generated by a switching operation of the pair of switching elements as an inverse bias power source for the switching elements.

DESCRIPTION OF THE PREFERRED EMBODIMENTS

Figure 1:
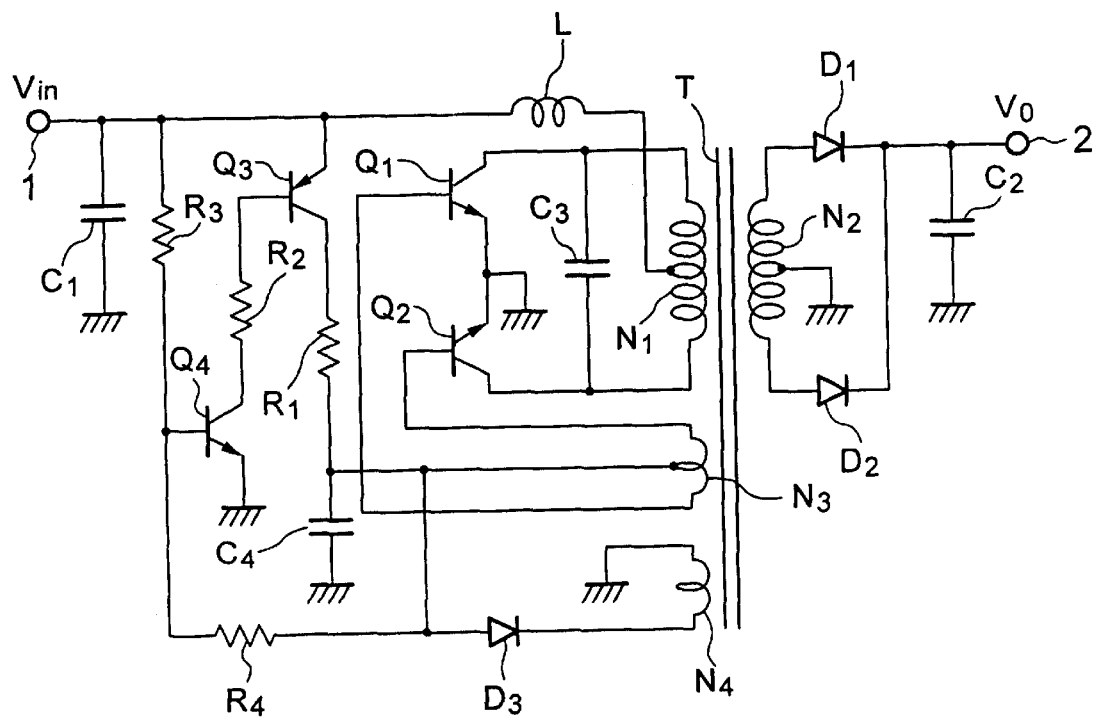
FIG. 1 is a circuit diagram illustrating an embodiment of a switching power circuit according to the present invention.
Figure 2:
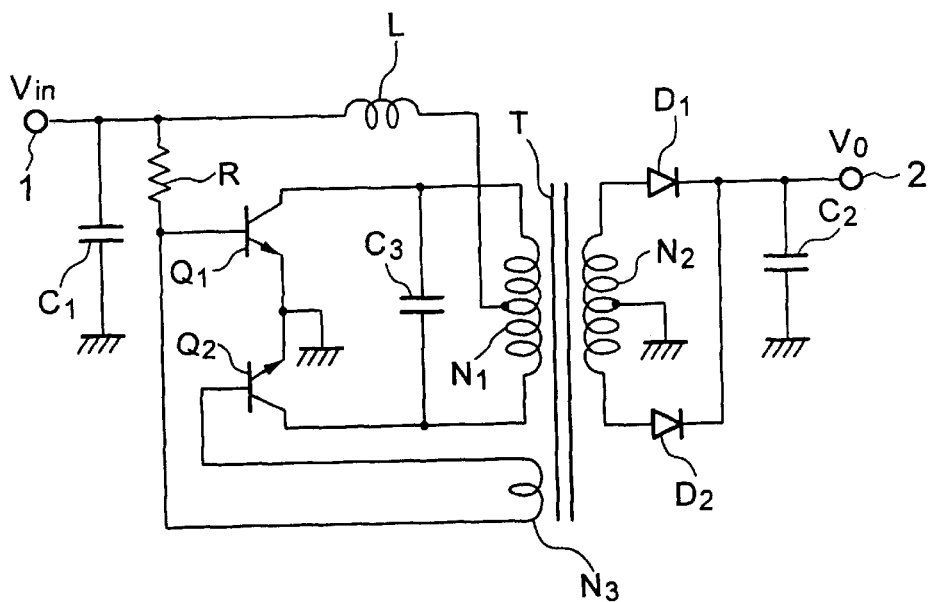
FIG. 2 is a circuit diagram illustrating a conventional switching power circuit.

FIG. 1 shows an embodiment of a switching power circuit according to the present invention. The present invention employs another bias circuit in place of a bias resistor R of the conventional switching power circuit shown in FIG. 2. In FIG. 1, each of circuit elements corresponding to that of FIG. 2 according to a prior art is designated by the similar reference numeral. A description for the similar circuit will be omitted.

A resistor R1 and a capacitor C4 are connected in series with a collector of a PNP transistor Q3 whose emitter is connected to an input terminal 1, while other end of the capacitor C4 is grounded. A connection point between the resistor R1 and the capacitor C4 is connected to a centertap of a tertiary winding N3 of a transformer T. Each end of the tertiary winding N3 is respectively connected to a base of transistor Q1 or Q2 respectively.

A base of the transistor Q3 is connected through a resistor R2 to a collector of a transistor Q4 whose emitter is grounded.

A base of the transistor Q4 is connected through a resistor R3 to the input terminal 1 and also is connected through a resistor R4 to an anode of a diode D3. A cathode of the diode D3 is grounded through a quaternary winding N4 of the transformer T.

The anode of the diode D3 is also connected to a connection point between the resistor R1 and the capacitor C4. Other configuration is similar to that of a circuit shown in FIG. 2 except there being no resistor R.

In a power circuit shown in FIG. 1, when an input voltage Vin is applied to the input terminal 1, each of a pair of transistors Q1 and Q2 is switched on alternately by a self-oscillation generated by the tertiary winding N3. Thereby, a current flowing from a centertap of a primary winding N1 is switched so as to flow alternately to one side of the primary winding N1 or to other side thereof. Then, an AC voltage generated on a secondary winding N2 is rectified and smoothed and as a result a DC voltage V0 is output to an output terminal 2.

An operation of a bias circuit will now be described.

When the DC voltage Vin is applied, the transistor Q4 is positively biased at the base thereof by the resistor R3 to be turned on, and then the transistor Q3 is turned on. Thereby, the transistors Q1 and Q2 are positively biased at the bases thereof by the resistor R1, and as a result generate an oscillation in a similar operation to that of a conventional circuit.

When the oscillation begins, a DC output V0 is output to the output terminal 2. At the same time, since a negative DC voltage is generated on the capacitor C4, the positive bias on the transistor Q4 is cancelled.

When being released from the positive bias due to the resistor R1, simultaneously, the transistors Q1 and Q2 are negatively biased by a negative voltage having been accumulated in the capacitor C4, and the operation is moved to class-C direction.

Though, in the above embodiment, an example of a switching power source for outputting the DC voltage V0 is shown, the present invention may be applied to an inverter configuration for outputting an AC output without rectifying and smoothing. In addition, the transistors Q1 to Q4 may employ elements in complementary relations to make all elements complementary.

According to the present invention, the C-class operation can be achieved and the heating during the operation of the power circuit can be reduced, which are difficult to be accomplished by the conventional circuit. Since both switching elements of Q1 and Q2 are not to be in a turned-on condition simultaneously, a thermal stability as well as an efficiency of the switching power circuit can be improved.

What is claimed is:

1. A switching power circuit comprising: a pair of switching elements connected to an end of a DC power source; a transformer including a primary winding having a centertap, a secondary winding connected to a load and a tertiary winding for a feedback oscillation; and a resonant capacitor connected parallel with the primary winding;

wherein each end of the primary winding is connected to each of the pair of switching elements respectively; the centertap is connected to other end of the DC power source through a choke coil; and each end of the tertiary winding is connected to each of the pair of switching elements respectively;

so that the switching power circuit is self-oscillated by a tertiary winding such that each of the pair of switching elements may be conducted alternately and thereby a current flowing from the centertap is switched so as to selectively flow alternately to one side of the primary winding or to other side of the primary winding to generate AC voltage on a secondary winding;

said switching power circuit characterized by that an operating point of the switching elements is changed from that in starting by using a DC voltage generated by a switching operation of the pair of switching elements as an inverse bias power source for the switching elements.

2. A switching power circuit in accordance with claim 1, in which said DC voltage used as said inverse bias power source is applied to said switching elements through a centertap arranged on said tertiary winding.

* * * * *

UNITED STATES PATENT AND TRADEMARK OFFICE
CERTIFICATE OF CORRECTION

PATENT NO. : 6,266,254 B1  Page 1 of 1
DATED : July 24, 2001
INVENTOR(S) : Tetushi Otake It is certified that error appears in the above-identified patent and that said Letters Patent is hereby corrected as shown below:

<u>Title page,</u>
Item [75], Inventor, change "Tetsushi Ohtake" to -- Tetushi Otake -- .

Signed and Sealed this

Eleventh Day of June, 2002

Attest:

Attesting Officer

JAMES E. ROGAN
*Director of the United States Patent and Trademark Office*